United States Patent [19]

Lysen

[11] Patent Number: 4,698,491

[45] Date of Patent: Oct. 6, 1987

[54] DEVICE FOR ASCERTAINING ALIGNMENT ERRORS IN SHAFTS ARRANGED IN TANDEM

[75] Inventor: Heinrich Lysen, Munich, Fed. Rep. of Germany

[73] Assignee: Prüftechnik Dieter Busch & Partner GmbH & Co., Ismaning, Fed. Rep. of Germany

[21] Appl. No.: 699,418

[22] PCT Filed: May 29, 1984

[86] PCT No.: PCT/EP84/00165

§ 371 Date: Feb. 1, 1985

§ 102(e) Date: Feb. 1, 1985

[87] PCT Pub. No.: WO84/04960

PCT Pub. Date: Dec. 20, 1984

[30] Foreign Application Priority Data

Jun. 3, 1983 [DE] Fed. Rep. of Germany ....... 3320163

[51] Int. Cl.$^4$ ................................................ G01V 1/20
[52] U.S. Cl. ...................................... 250/201; 356/400; 250/561

[58] Field of Search ............... 356/399, 400, 141, 152; 250/560, 561, 216, 201

[56] References Cited

U.S. PATENT DOCUMENTS

| | | | |
|---|---|---|---|
| 2,703,505 | 3/1955 | Senn | 356/400 |
| 3,603,691 | 9/1971 | Hamilton | 356/400 |
| 3,775,012 | 11/1973 | Ling et al. | 250/561 |
| 3,923,402 | 12/1975 | Turcotte | 356/141 |
| 4,097,157 | 6/1978 | Lill | 356/152 |
| 4,117,319 | 9/1978 | White | 356/141 |
| 4,518,855 | 5/1985 | Malak | 250/201 |

Primary Examiner—David C. Nelms
Attorney, Agent, or Firm—Robert W. Fiddler

[57] ABSTRACT

Device intended to determine whether two shafts arranged one behind the other are aligned or parallel or whether they are offset with a certain angle. The device employs a light beam S, S' and a mirror prism (6) or any other optical system and displays separately the alignment errors directly as a function of the parallel displacement and of the angular displacement. It may be used to align shafts and/or monitor permanently the alignment state of the shafts (3, 4).

9 Claims, 13 Drawing Figures

Fig. 6b $$y \approx \frac{J_a + J_b - J_c - J_d}{J_a + J_b + J_c + J_d}$$

$$x \approx \frac{J_b + J_d - J_a - J_c}{J_a + J_b + J_c + J_d}$$

$J_a, J_b, J_c, J_d$ = PHOTODETECTOR CURRENTS

DEVICE FOR ASCERTAINING ALIGNMENT ERRORS IN SHAFTS ARRANGED IN TANDEM

This invention relates to apparatus for determining whether shafts arranged in tandem are aligned.

Devices of this type are used mainly in order to be able to accurately align two machines, whose shafts are to be coupled together rigidly, before these shafts are joined.

It is an object of the invention to provide a device for the purpose stated in the characterizing clause of claim 1, with which, while employing relatively little effort for constructions, a very high measuring accuracy is achievable and which moreover makes it possible to work rapidly and to recognize immediately any parallel or angular misalignment errors as well as the magnitude of the particular error. The alignment error, with which the central axes of the shafts cross one another at a distance, should be indicated in such a manner, that the error is resolved immediately into a strictly parallel misalignment component and a strictly angular misalignment component, so that both types of error can be identified separately by a single measuring process in the form of rotating the shafts through 360° and can then be eliminated by a single process in which one machine is aligned relative to the other.

For the inventive device, the parts of the device, which are to be arranged on the individual shafts, are optically coupled together, so that there are no projecting support rods, which, under the influence of gravity, could cause errors in the measurement. In the course of jointly rotating the shafts through 360° by one of the two alternatives described above, possible alignment errors in the shaft manifest themselves at the additional measurement receiver as a change in the distance of the light-beam incident point from the fixed reference point on the shaft, the component of the change in distance, radial to the first shaft, corresponding to the strictly parallel misalignment and the component vertical to the first shaft corresponding to the angular misalignment. The latter comes about owing to the fact that three special properties of a rectangular reflecting prism are utilized simultaneously in the invention. One of the properties consists therein that a tilting of the prism about the apex line lying at its 90° angle has no effect on the reflection of the light beam to the additional measurement receiver. The second property consists therein that a rotation of the prism about an axis, perpendicular to the aforementioned apex line and parallel to the plane of its hypotenuse, expresses itself in an angle between the incident beam on and the reflected beam from the prism, which is twice as large as the angle of rotation about this axis, so that the component of the change in the distance, perpendicular to the radial direction, corresponds directly at the additional measurement receiver to the strictly angular misalignment between the two shafts. And the third property finally consists therein that a displacement of the prism parallel to itself in the direction of the last mentioned axis, which runs perpendicular to the apex line and parallel to the plane of the hypotenuse, leads to a change in the distance between the incident light beam and the reflected light beam that, measured in the displacement direction, is twice as large as this displacement and so describes a parallel misalignment. Two groups of readings, in the form of the two components of the change in distance, are therefore obtained with the inventive device in the course of rotating the shaft through 360°. One of these groups, which encompasses the change in the distance component of the light beam incident point from, for example, the reference point radial to the first shaft, indicates the strictly parallel misalignment, while the other, which encompasses the change in the distance component perpendicular to the first shaft, describes the strictly angular misalignment. From this, it is easy to determine the values by which one machine must be shifted relative to the other, for example in height and towards a side and possibly to a different extent at the front and rear support points, in order to eliminate alignment errors in one stroke, that is, without remeasuring after a partial correction.

The use of reflecting prisms, with a light beam directed on the prism as measurement indicator and a measurement receiver, which receives the beam that is reflected from the prism and displaced corresponding to a displacement of the prism, is already known as such in the field of precision measurement techniques. Of the aforementioned three properties however, only the change in distance between the incident and reflected light beams, which describes the parallel displacement, and the insensitivity of the prism to being tilted about an axis parallel to the apex have been utilized for measurement purposes until now, while the above-mentioned third property of the change in the angle between an incident and a reflected light beam on rotating a prism about an axis perpendicular to the apex line and parallel to the plane of the hypotenuse, was regarded as interfering and suppressed by appropriate means. (German book: Kurt Räntsch, Carl Hanser publishing house, "Die Optik in der Feinmesstechnik" (Optics in Precision Measurement Techniques), especially pages 233 and 234)

The invention is described in greater detail by means of the drawing and examples of the operation:

In the drawing,

FIG. 6b shows the cross section of the measurement receiver of FIG. 6a, along line VIb—VIb of FIG. 6a.

FIG. 6c shows the cross section of the measurement receiver of FIG. 6a along line VIc—VIc in FIG. 6a.

Figure 1:
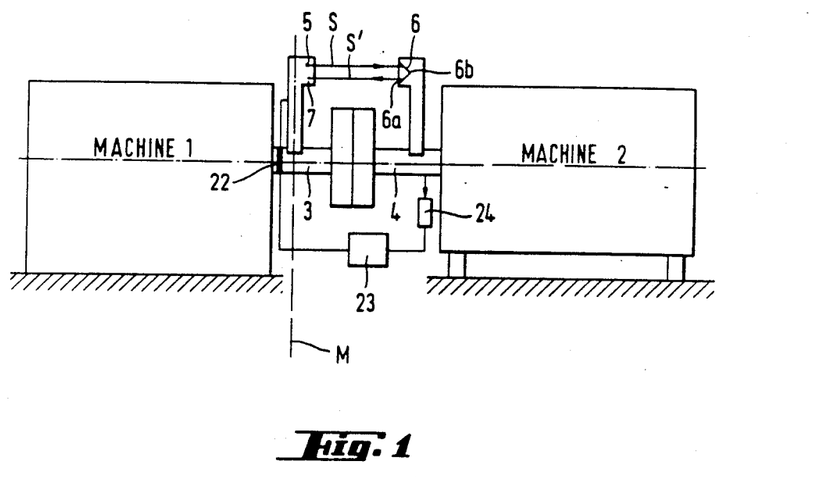
FIG. 1 shows a schematic view of the inventive device, mounted on the shafts of two machines to be aligned, and of the machines, as seen from the side.
Figure 2:
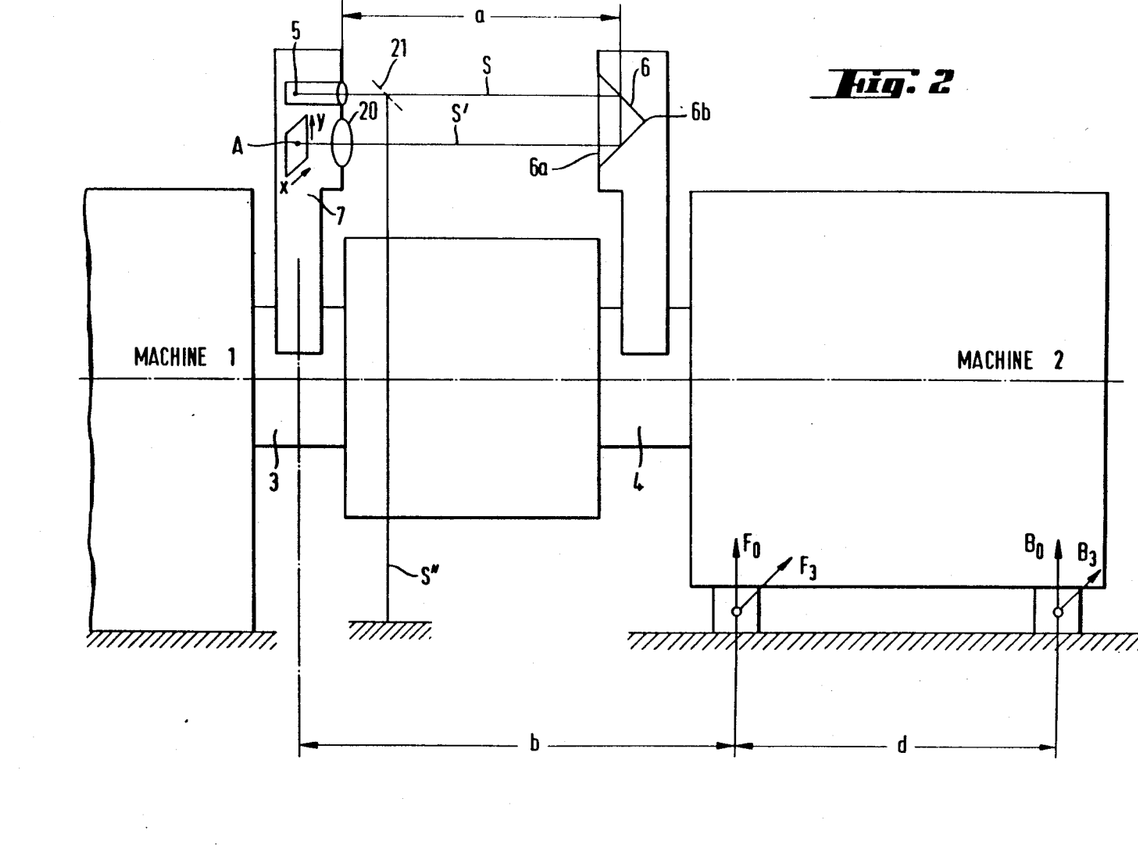
FIG. 2 shows the device of FIG. 1 in the mounted state on the shafts in greater detail, also as seen from the side.

In FIGS. 1 and 2 of the drawing, two machines 1 and 2 are shown, which are to be connected and which, before the shafts are coupled together, are to be aligned, so that the center lines of the shafts are in alignment. In order to determine later alignment errors, machines 1 and 2 are monitored constantly. For this purpose, an optical device comprising a light emitter 5 acting as a signal emitter is attached to shaft 3. A rectangular prism 6 is rigidly mounted on shaft 4, and acts as a signal reflector. Signal receiver 7 is rigidly attached to shaft 3 comprising a light emitter 5, acting as measurement transmitter and rigidly attached to shaft 3, a rectangular prism 6, rigidly attached to the other shaft 4 and acting as measurement receiver, and an additional measurement receiver 7 that, like light emitter 5, is rigidly attached to shaft 3, are mounted on machine shafts 3 and 4.

Figure 3A:
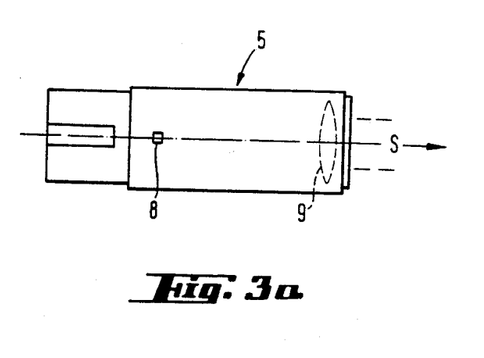
FIG. 3a shows a schematic plan view of a preferred version of the measurement transmitter.
Figure 3B:
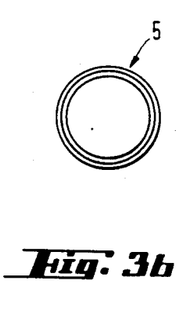
FIG. 3b shows the front view of FIG. 3a (as seen from the right by the viewer of FIG. 3a).

As shown in FIGS. 3a and 3b, light emitter 5 has a laser crystal 8 and a collimating lens 9 and produces a light beam S with an extremely low divergence of the order of magnitude of less than 1 mrad, which it emits parallel to the center line of shaft 3 at a distance from this towards machine 2. On shaft 4, light beam S strikes rectangular prism 6, which is so aligned at an appropriate distance from the center line of machine 2, that the plane of its hypotenuse 6a lies perpendicular to the center line of shaft 4 of machine 2 and the apex line lying at the 90° angle of the prism runs perpendicular to the radial plane of shaft 4, which intersects the prism at about the center.

Figure 5A:
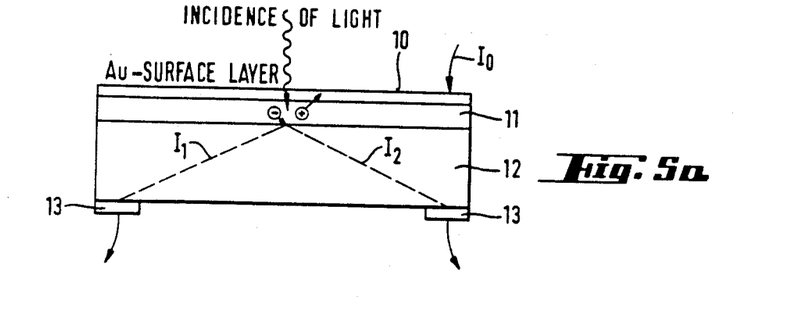
FIG. 5a shows the section through an analogous photoelectric semiconductor position detector, used in the invention as an additional measurement receiver, to demonstrate the principle of the operation.
Figure 5B:
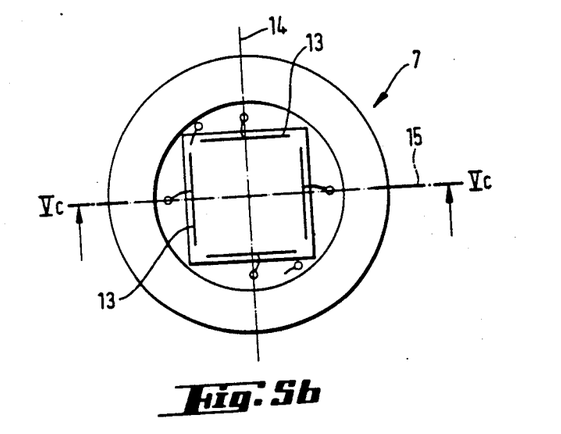
FIG. 5b shows a front view of the the function detector of FIG. 5a in biaxial version.
Figure 5C:
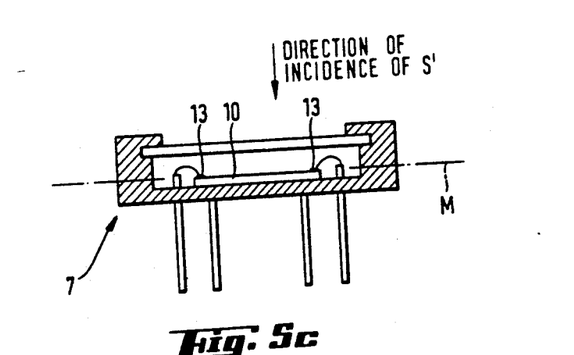
FIG. 5c shows a cross section through the detector of FIG. 5b along line Vc—Vc.
Figure 6A:
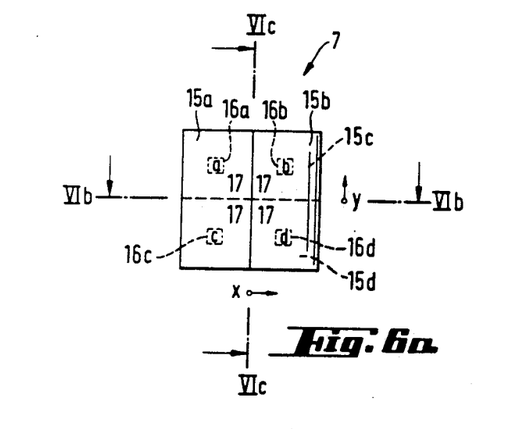
FIG. 6a shows a front view of a different version of the additional measurement receiver.
Figure 6B:
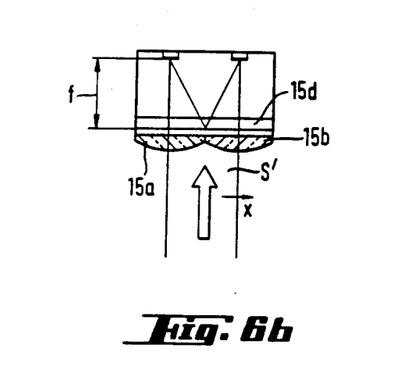
Figure 6C:
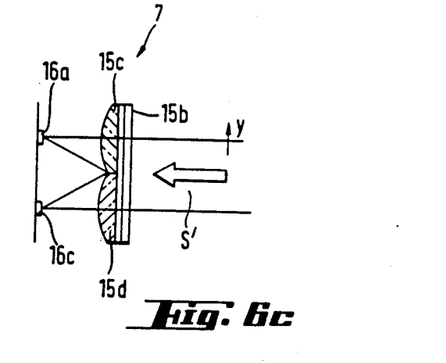

The prism reflects light beam S of light emitter 5 back to machine 1 as light beam S' and this light beam S' falls there on the additional measurement receiver 7 that, as shown in FIGS. 5a, 5b and 5c, may be a biaxial analogous photoelectric semiconductor position detector or may consist of the combination of lenses and photodetectors shown in FIGS. 6a to 6c.

In the biaxial, analogous, photoelectric semiconductor version of FIGS. 5a to 5c, the additional measurement receiver 6 has a surfacing 10 of gold, below this a depletion zone 11 and below this again a high-resistance substrate 12, a current $I_o$ being supplied to the gold surfacing 10 and collector strips 13, over which the current supplied, $I_o$, is divided up into component currents and discharged, being arranged at the sides, as well as above and below the essentially square cross section of the high resistance substrate. The division of the current $I_o$ depends on the site at which an incident beam strikes the gold surfacing essentially vertically. In the version of a biaxial position detector, shown in FIGS. 5b and 5c, the current $I_o$ supplied is divided into four component currents, which are discharged over individual collector strips 13 and the magnitude of which depends on the distance of the incident point of the light from the center. When the beam strikes exactly in the center of the square gold surfacing, which is congruent with the depletion zone and the substrate, the four component currents are of equal magnitude. The rectangular components of the distance of an excentric incident point of the light from the center of the coordinates can be read from the difference in the currents at opposite pairs of collector strips 13.

Position detectors of the type described above are known and commercially available.

The position detector of FIGS. 5a to 5c is arranged on shaft 3 as additional measurement receiver 7 in such a manner, that one plane of symmetry 14 (FIG. 5b) coincides with a radial plane of shaft 3 and the other plane of symmetry 15 is perpendicular to this and parallel to the center line of shaft 3.

The same result is achievable with the position detector of FIGS. 5a to 5c and the detector of FIGS. 6a to 6c, which consists of four cylindrical lenses 15a to 15d and four photodetectors 16a to 16d, which are arranged at a distance f behind the lenses in the direction of the incident light. The four cylindrical lenses 15a to 15d are arranged in pairs next to each other and the pairs are arranged in tandem in such a manner that the center lines of a pair run parallel to each other, but the center lines from pair to pair cross each other at right angles, the plane convex lenses adjoining each other with their plane sides back to back. The two lenses 15a, 15b, facing the incident light beam focus the incident light in each case on the center line of the photodetectors 16a, 16c or 16b, 16d arranged behind them, while the cylindrical lenses 15d, 15c at the back focus the incident light on the common center line of the photodetectors 15a, 15b, or 15c, 15d behind them. The light incident on the arrangement of lenses from the front is then focused by the lenses onto the four diode points, the strength of the light and therefore the output signal of the photodetectors depending on the share of the incident light, that is apportioned to the individual lens quadrants of in each case two crossed split lenses. These quadrants have been given the reference number 17 in FIG. 6a.

In this version of the additional measurement receiver 7, diodes 16a to 16d also supply currents, which are identical when the light incident on the cylindrical lens arrangement is symmetrical, while with asymmetrical incident light pairwise current differences arise, which are characteristic of the deviation of the incident light from the center position towards the coordinates lying in the direction of the cylinder axes.

The detector of FIGS. 6a to 6c is also arranged on shaft 3 in such a manner that one detection direction corresponding to the one displacement coordinate of the incident light runs radially to the shaft and the other vertically.

Figure 4A:
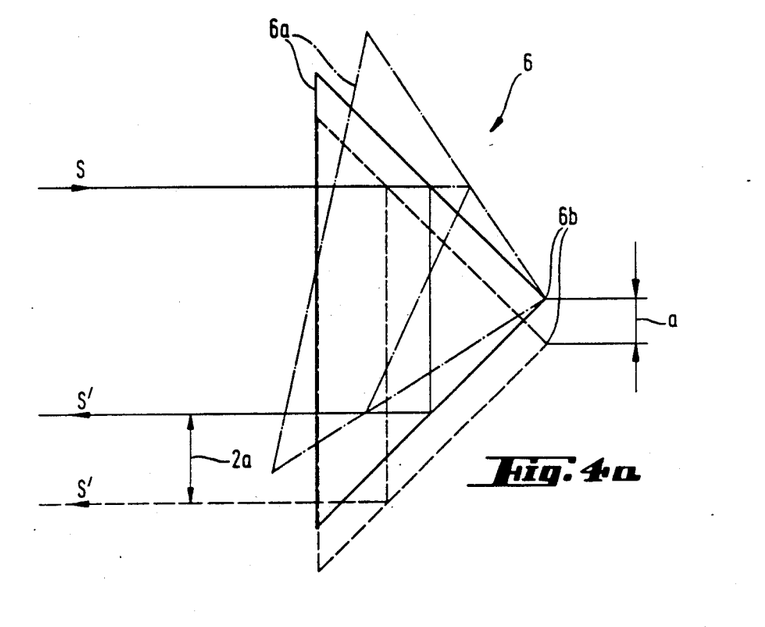
FIG. 4a shows a side view of the prism acting as measurement receiver on the second machine shaft, as well as in various angular positions relating to the apex line perpendicular to the plane of the drawing at the 90° angle.
Figure 4B:
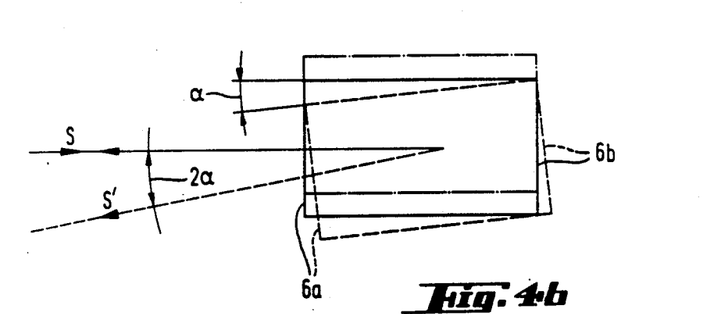
FIG. 4b shows the prism from FIG. 4a in a view from above in two different angular positions relating to an axis of rotation that is perpendicular to the apex line and parallel to the plane of the hypotenuse of the prism.

FIGS. 4a and 4b show prism 6 in various positions. The plane of the paper of FIG. 4a coincides with a radial plane of shaft 4 and the apex line 6b at the right angle of the prism is perpendicular to it.

When light beam S, emitted by the light emitter, strikes the plane of the hypotenuse 6a of the prism perpendicularly, it also emerges once again perpendicularly to it at a given distance as light beam S'. The reflection relationships are not altered if the prism is tilted about an axis parallel to apex line 6b. A change in the incident angle of the light in the radial plane of shaft 4, which is congruent with the plane of the paper in FIG. 4, therefore has no effect on the reflection relationships. A displacement of the prism parallel to the plane of the hypotenuse 6a produces twice as large a change in the distance between the entering light beam S and the emerging light beam S'.

On the other hand, as best seen in FIG. 4b tilting the prism about an axis perpendicular to apex line 6b and parallel to the plane of the hypotenuse 6a produces twice as large a change in the reflection angle in the direction perpendicular to the plane of the paper in FIG. 4a. This means that a migration of the incident point A of light beam S' on the additional measurement receiver 6 in the direction radial to shaft 3 can originate only from a parallel misalignment of shafts 3 and 4 and a migration in a direction perpendicular to shaft 3 can originate only from an angular misalignment of shafts 3 and 4.

If there is parallel and angular misalignment, this migration of the incident point in the directions mentioned takes place when the two shafts are not quite in alignment and go through a whole revolution over 360°. It is moreover sufficient to record pairs of values arising at angular positions differing by 90° from an initial position. The initial position and additional measurement positions are marked by an angular position indicator which works synchronously with the speed of rotation and is not shown. A measurement cycle, through which the parts of the optical device, mounted on the machine shafts, pass in a measuring process extending over 360°, it being assumed that the one machine has a parallel as well as an angular misalignment relative to the other, is shown schematically as well as in a perspective view in FIG. 7. The components labelled y are the components of the parallel misalignment and are in each case measured radially to the shaft. The vertical components x are the components of angular misalignment.

Figure 7:
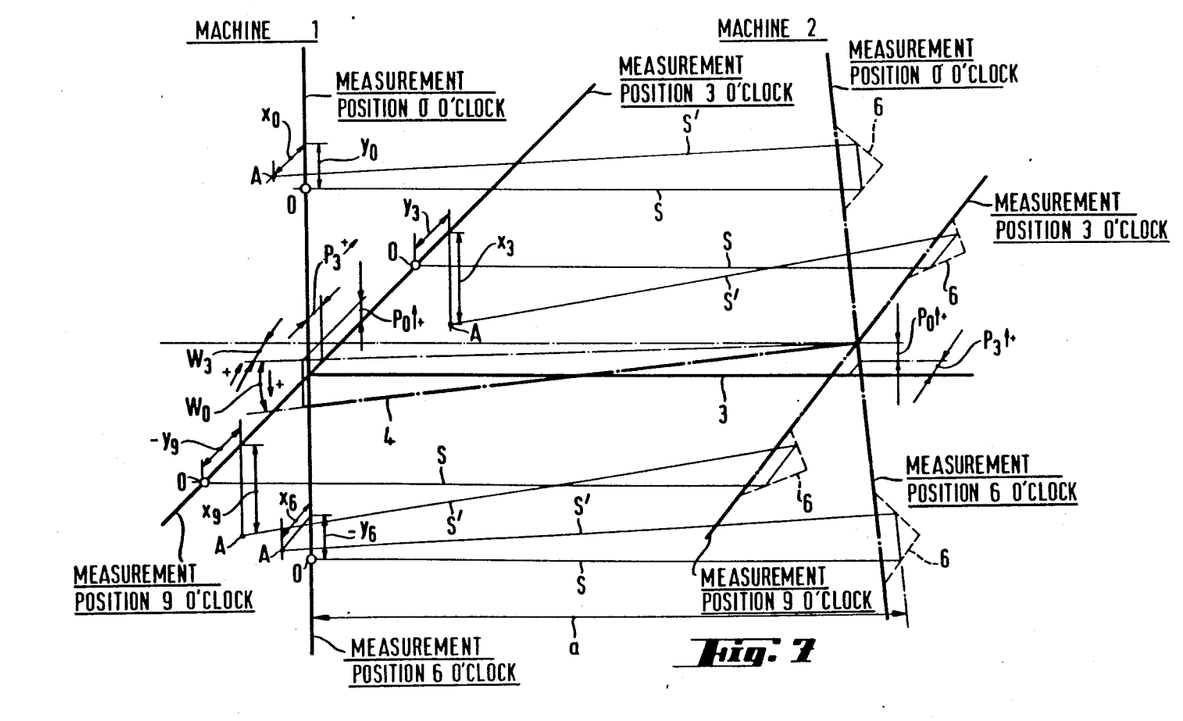
FIG. 7 shows a perspective, schematic representation of the measuring process and the deviation values occurring on rotating the shaft at intervals of 90° over an angular range of 360°.

The subscripts of the x and y values correspond to the respective measurement position, which, with reference to the positions of the clock hand, are labelled 0 o'clock (starting position), 3 o'clock, 6 o'clock and 9 o'clock, this corresponding to a rotation of the shafts through 0°, 90°, 180°, and 270°, relative to the starting position of 0°.

It can be shown that the parallel misalignment in the direction of the radial plane in the 0 position is equal to $$P_0 = (y_0 - y_6)/4$$

and the parallel misalignment in the direction at right angles to this is $$P_3 = (y_3 - y_9)/4$$

For the angular misalignment in the 0 direction, that is, perpendicular to the radial plane of shaft 3, which is in the starting position and contains the light emitter, $$w_0 = (x_3 - x_9)/4a$$

and for the angular mismatch in the direction at right angles to this $$w_3 = (x_0 - x_6)/4a$$

From these values obtained from the measurements, corrections to the installation of the machines, whether by raising or lowering or shifting to the left or the right, can easily be calculated in accordance with the equations below, the quantities given having been taken from FIGS. 2 and 7:

$$F_o = -F_0 - W_0 \times b$$

$$F_3 = -F_3 - W_3 \times b$$

$$B_o = -F_0 - W_0 \times (b+d)$$

$$B_3 = -F_3 - W_3 \times (b+d)$$

the value $F_o$ being the displacement of machine 2 at the front feet in the vertical direction
the value $F_3$ being the displacement of machine 2 at the front feet in the sideways direction
the value $B_o$ being the displacement of machine 2 at the rear feet in the vertical direction and
the value $B_3$ being the displacement of machine 2 at the rear feet in the sideways direction
it being assumed that the radial plane of machine 1, in which the light emitter is located, is vertical in the "0 o'clock" measuring position.

For determining the magnitude of the correction, a knowledge of the distance b between the measurement plane M and the midpoint between the front feet of machine 2 is required. In order to make the determination of this distance easier, a beam divider 21 is inserted in the path of beam S before the emitter. This beam divider diverts a partial beam S'' from light beam S and at right angles to it, sideways past any coupling parts and the like, so that the incident point of this light beam S'' on the foundation can be used as a mark for making the measurement.

In order to exclude errors due to natural fluctuations of the light in the surroundings, it is advisable to modulate light beam S, emitted by light emitter 5, with a higher frequency.

Instead of a prism, an appropriate arrangement of mirrors or the like can also be used as a functionally equivalent optical system.

For the purpose of increasing the accuracy of the measurement of the additional measurement receiver 6, it is advisable to arrange a reducing lens 20, which reduces the diameter of light beam S—to a quarter in the example of the operation—in front of the additional measurement receiver 6.

The inventive device can be used either only for initially aligning two turning machines, coupled at the shafts, before they are started up or possibly also subsequently for continuously monitoring the alignment condition.

In the first case, the shafts, after the device is mounted, are turned by a method other than by the machines through a complete revolution for a measuring procedure according to one of the two alternatives described at the beginning. At the same time, pairs of measurements are made at the different angular positions. This can be done automatically for example and the data can at the same time be fed into a computer. The correction values are calculated from the measurements and displayed in an appropriate manner, so that the necessary alignment corrections can be carried out on the machines. After the corrections have been made, the device is taken down again and is then available for aligning other machines.

On the other hand, for monitoring the machines continuously, the device remains permanently on the shafts, even while the machines are in operation. After the initial alignment, it is then not necessary to calculate possible correction values continuously. It suffices to display the measurement data continuously and/or to derive a warning signal from it when a permissible faulty alignment range is exceeded. For this purpose, the electrical signals, which are generated in the second measurement receiver 7 and which correspond to possible deviation coordinates of the light beam incident point from the detector midpoint, present at the individual measurement positions, are transferred continuously over slip rings, a rotating repeater or the like 22 in the manner only indicated in FIG. 1 to a computer 23, which optionally may have a display device and in which, assisted by an angular position indicator, they are utilized to create a display or a warning system by means familiar to those skilled in the art. This angular position indicator 24 is also only indicated in FIG. 1.

Unbalanced masses, which are compensated for initially, can occur again subsequently in the rotating parts during the operation of the machine, just as can alignment errors. Such fresh unbalanced masses lead to shaft oscillations, which usually have a somewhat different effect on the two shafts and consequently express themselves in the deviation signals, which however have special characteristics and therefore can be differentiated, possibly as a superimposition, from those resulting from alignment errors. This ensures that that the hazard, as well as the cause, is identified.

This system of continuously monitoring is not only a full substitute for the previous systems of continuously monitoring rotating machines coupled at the shafts, with which, alternately, oscillations of the shaft blocks were detected, bearing clearance was observed, the bearing temperature was measured, etc. and by means of which critical conditions frequently manifested themselves only when some damage has already occurred. Rather, it is superior to the known types of continuous monitoring systems because of the ability to differentiate the various causes of dangerous operating conditions and because it indicates at all times the current state of the alignment.

I claim:

1. Apparatus for ascertaining whether two shafts (3) and (4) arranged in tandem have their center lines aligned and the extent of any parallel and/or angular displacement thereof, said apparatus comprising:
    a signal emitter positioned on the first of the shafts to be aligned to emit a signal indicative of the position of the first shaft;
    a signal reflector positioned on the second of the shafts (4) to be aligned in the path of a signal from said emitter reflecting the signal received from said emitter back to the first shaft, said reflector comprising a rectangular reflecting prism system (6) arranged on the second shaft (4), with the plane of the prism hypotenuse (6a) of said prism system essentially perpendicular to the center line of the second shaft (4);
    and a signal receiver positioned on the first shaft (3) to receive the signal reflected by said reflector and producing an electrical signal determined by the position at which the signal from said reflector impinges on said receiver, said signal receiver comprising a measurement receiver (7), arranged on the first shaft (3) and generating two signals, which correspond to the coordinates (x,y) of the distance of the light-beam incidence point (A) from a fixed reference point (0) in a measurement plane essentially perpendicular to the center line of the first shaft (3), whereby one of said signals indicates parallel displacement of one shaft with respect to the other, and the other of said signals indicates angular displacement of one shaft with respect to the other.

2. Apparatus as in claim 1, wherein said measurement receiver (7) is a biaxial, analog, photoelectric, semiconductor position detector.

3. Apparatus as in claim 2, wherein an optical system (20), which reduces the diameter of the light beam (S'), is connected in optical series with said measurement receiver (7).

4. Apparatus as in claim 1, wherein said light emitter (5) has a laser diode (8).

5. Apparatus as in claim 1, wherein a beam divider, which deflects a partial beam (S") aside at an angle of 90°, is positioned in the path of light beam (S) of light emitter (5).

6. Apparatus as in claim 1, wherein the signals, generated by the measurement receiver (7), correspond to the rectangular coordinates (x, y) of the distance of the light-beam incidence point (A) from the reference point (0) in a rectangular coordinate system, one coordinate axis of which coincides with the radial line (R) of the first shaft (3), on which the intersection point of the optical center line of measurement transmitter (5) with measurement plane (M) lies.

7. Apparatus as in claim 1, comprising an evaluating device (23); and impulse generator 24 working in synchronism with the speed of rotation of the shafts, to continuously monitor shaft position.

8. Apparatus as in claim 1 in which said signal emitter comprises:
    a light emitter (5) arranged on the first shaft (3) for producing a light beams (S) of relatively small divergence.

9. Apparatus as in claim 1, in which the apex of said prism system lies on a line non-radial with respect to the axis of the second shaft (4).

* * * * *